United States Patent

Dentella et al.

(10) Patent No.: US 9,948,215 B2
(45) Date of Patent: Apr. 17, 2018

(54) SOFT STARTING SYSTEM FOR AN ELECTRICAL MOTOR

(71) Applicant: Schneider Electric Industries SAS, Rueil-Malmaison (FR)

(72) Inventors: Alain Dentella, Beaucroissant (FR); Delcho Penkov, Saint Martin d'Heres (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 0 days.

(21) Appl. No.: 15/201,796

(22) Filed: Jul. 5, 2016

(65) Prior Publication Data

US 2017/0070166 A1 Mar. 9, 2017

(30) Foreign Application Priority Data

Sep. 4, 2015 (FR) ...................................... 15 58204

(51) Int. Cl.
*H02P 1/16* (2006.01)
*H02P 1/42* (2006.01)

(52) U.S. Cl.
CPC ................ *H02P 1/16* (2013.01); *H02P 1/423* (2013.01); *Y02P 80/14* (2015.11); *Y02P 80/152* (2015.11)

(58) Field of Classification Search
CPC ...... H02P 1/04; H02P 1/28; H02P 1/16; H02P 1/423; Y02P 80/14; Y02P 80/152

(Continued)

(56) References Cited

U.S. PATENT DOCUMENTS 2,889,495 A * 6/1959 Farmer ................ H03K 17/288
313/238
4,056,776 A * 11/1977 Olsson ................ G01R 31/263
324/537

(Continued)

FOREIGN PATENT DOCUMENTS

CN  102185543 B  4/2014
FR  2 980 058 A1  3/2013

OTHER PUBLICATIONS

George Templeton Thyristor; "AN1048/D RC Snubber Networks for Thyristor Power Control and Transient Suppression", Jun. 19, 2008 (Jun. 19, 2008).*

(Continued)

*Primary Examiner* — Rita Leykin
(74) *Attorney, Agent, or Firm* — Oblon, McClelland, Maier & Neustadt, L.L.P.

(57) ABSTRACT

Starter system for an electric motor (M) supplied by an electrical network (1), the starter system comprising an electronic control circuit (7) and an electronic switch (10) for controlling one phase of the motor (M), the electronic switch (10) being controlled by the control circuit (7). The starter system comprises a sensor (3) intended to deliver an analog signal (4) that is representative of the derivative of a current flowing through the phase of the motor (M), a detection board (5) comprising means for transforming said analog signal (4) into a binary signal (6) that is representative of the changes in sign of said analog signal, and comprising means for transmitting said binary signal to the control circuit (7), so as to optimize the control of the electronic switch (10).

11 Claims, 2 Drawing Sheets

(58) Field of Classification Search
USPC ........ 318/490; 323/230, 238, 321, 320, 322, 323/239, 210, 211, 241, 283
See application file for complete search history.

(56) References Cited

U.S. PATENT DOCUMENTS

| | | | | |
|---|---|---|---|---|
| 4,459,532 | A * | 7/1984 | Schutten | H02P 1/42 318/781 |
| 4,705,399 | A * | 11/1987 | Graindorge | G01C 19/726 356/464 |
| 5,008,608 | A * | 4/1991 | Unsworth | H02P 27/02 318/729 |
| 5,105,130 | A * | 4/1992 | Barker | B23B 45/02 318/268 |
| 5,608,311 | A * | 3/1997 | Innes | G05F 1/12 323/218 |
| 6,051,893 | A * | 4/2000 | Yamamoto | H02J 9/06 307/43 |
| 6,154,301 | A * | 11/2000 | Harvey | H04B 10/6911 398/1 |
| 6,192,008 | B1 * | 2/2001 | Kim | G11B 11/10515 369/13.02 |
| 6,195,245 | B1 * | 2/2001 | Kobsa | H02H 9/06 361/119 |
| 6,421,220 | B2 * | 7/2002 | Kobsa | H04M 3/18 361/117 |
| 6,549,014 | B1 * | 4/2003 | Kutkut | G01R 1/203 320/132 |
| 6,617,566 | B2 * | 9/2003 | Kartalopoulos | G06K 7/10851 250/214 DC |
| 6,711,189 | B1 * | 3/2004 | Gilliland | H01S 5/042 323/304 |
| 6,756,930 | B1 * | 6/2004 | Nunuparov | H02M 3/07 323/304 |
| 6,850,426 | B2 * | 2/2005 | Kojori | H02P 23/0004 363/123 |
| 6,853,014 | B2 * | 2/2005 | Taylor | H01L 29/155 257/113 |
| 7,307,569 | B2 * | 12/2007 | Vrazel | H03M 1/1265 341/144 |
| 7,944,660 | B2 * | 5/2011 | Kumfer | H01H 59/0009 361/62 |
| 7,949,483 | B2 * | 5/2011 | Discenzo | G05B 19/4062 340/648 |
| 8,076,882 | B2 * | 12/2011 | Dooley | H02P 25/024 318/400.01 |
| 8,217,606 | B2 * | 7/2012 | Hyde | H02K 3/28 318/400.4 |
| 8,222,842 | B2 * | 7/2012 | Hyde | H02K 3/28 310/158 |
| 8,536,813 | B2 * | 9/2013 | Hyde | H02K 3/28 318/400.32 |
| 8,692,537 | B2 * | 4/2014 | Hyde | H02J 3/16 307/147 |
| 8,810,161 | B2 * | 8/2014 | Cheatham, III | H01J 29/02 315/14 |
| 8,816,624 | B2 * | 8/2014 | Hyde | H02K 3/28 318/400.37 |
| 8,896,334 | B2 * | 11/2014 | Woodley | H03K 17/166 324/115 |
| 8,928,228 | B2 * | 1/2015 | Cheatham, III | H01J 33/00 315/108 |
| 9,054,725 | B1 * | 6/2015 | Fest, Sr. | H04L 12/10 |
| 9,225,170 | B2 * | 12/2015 | Hyde | H02J 3/16 |
| 9,397,591 | B2 * | 7/2016 | Hyde | H02K 3/28 |
| 9,664,730 | B2 * | 5/2017 | Woodley | H03K 17/166 |
| 2011/0062934 | A1 * | 3/2011 | Wolf | H02M 7/48 323/304 |
| 2014/0225554 | A1 | 8/2014 | Penkov et al. | |
| 2015/0311829 | A1 | 10/2015 | Penkov et al. | |
| 2016/0268933 | A1 * | 9/2016 | Kim | H02P 1/04 |

OTHER PUBLICATIONS

French Preliminary Search Report (with Written Opinion) dated Apr. 29, 2016 in French Application 15 58204 filed on Sep. 4, 2015 (with English Translation of Categories of Cited Documents).
George Templeton, "AN1048/D RC Snubber Networks for Thyristor Power Control and Transient Suppression", ON Semiconductor, http://onsemi.com, 2008, 22 pgs.

* cited by examiner

SOFT STARTING SYSTEM FOR AN ELECTRICAL MOTOR

TECHNICAL FIELD OF THE INVENTION

The present invention relates to starting an electric motor using a soft starter system. It is applicable to motors supplied with power by high-voltage AC electrical networks, but also by low-voltage electrical networks. In the present document, the term "high voltage" covers the fields of medium voltage and high voltage, i.e. typically voltages of between 1000 V and 50 kV.

PRIOR ART

When starting an electric motor, the motor draws current from the electrical network supplying it with power. A drop in the voltage of the network may ensue, causing malfunctions in certain sensitive loads and, potentially, load shedding across the network.

To avoid this problem, it is known practice to connect the motor to the electrical network via a soft starter system, which allows the value of the RMS voltage applied to the motor over the starting phase to be gradually raised by controlling electronic power switches that are interposed between the motor and the electrical power supply source. These electronic switches, which generally comprise thyristors, are fragile and sensitive to the transient voltages and currents to which they are subjected during switching operations. In particular, when the order to close a thyristor is not carried out at an appropriate moment, it may ultimately lead to this thyristor breaking or prematurely wearing out. For this reason they should, in particular, be controlled at the moment at which the voltage across the terminals of the switch is at a minimum.

For gradually starting an electric motor, the document FR2980058 has already described a method for controlling an electronic power switch, which switch is composed of two thyristors connected back to back with, in parallel, a damping circuit of RC type, also known as a snubber. In this document, based on an evaluation of the voltage across the terminals of the switch, the method makes it possible to determine a time range for closing the switch in which the voltage is minimized, in order to preserve the reliability and service life of the thyristors. In particular, a time range is chosen that corresponds to the negative half-cycles of the AC component of the voltage across the terminals of the controlled switch.

Measuring the transient voltage across the terminals of an electronic switch requires quite sophisticated processing of the signal however, in particular high-frequency sampling, in order to detect the voltage minima. Furthermore, this complicates the design of the enclosure for the soft starter system, and hence increases the cost thereof.

For this reason, in order to determine an adequate time range for closing the thyristors of an electronic switch, it is preferable to measure the derivative of the current flowing across the terminals of the switch. Specifically, after an electronic switch has opened, the derivative of the transient current across the terminals of the switch, i.e. of the damped transient current flowing through the snubber, is the negative image of the transient voltage across the terminals of the switch. The derivative of the current may therefore be used to synchronize the switching of the switch to be controlled. The zero crossings, i.e. the changes in sign, of the derivative of the transient current across the terminals of the switch when the thyristors of the switch are not conducting are therefore detected, this giving the oscillating frequency of this transient current.

To measure the derivative of the current flowing across the terminals of a switch, a sensor, such as e.g. a Rogowski torus, is used, which has the advantage of delivering a signal with a negligible delay of the order of microseconds and is not affected by the frequency of the current in the spectrum of transient frequencies that are encountered in practice (i.e. of the order of 1 to 5 kHz).

However, the environment in which the one or more sensors are located is an environment comprising substantial electric (electrical isolation) and/or magnetic (the motor's power cables) fields. These fields cause substantial harmonics and high frequencies (when the thyristors are switching) which lead to electromagnetic interference (EMC) in the analogue electrical measurement signals arising from the one or more sensors and which are destined for the electronic control circuit of the starter.

This is especially true for motors supplied by a high-voltage electrical network and for which the nominal voltages are higher than 1000 V, or even higher than 5.5 kV, due to the high values of the transient voltages and currents to which the controlled switches are subjected in these cases, but this is also applicable to motors supplied with power by a low-voltage network.

One of the aims of the invention is therefore to propose a solution that allows the aforementioned problems to be overcome, while respecting the performance constraints that are necessary for controlling the thyristors.

SUMMARY OF THE INVENTION

This aim is achieved by a starter system for an electric motor supplied by an electrical network, comprising an electronic control circuit and an electronic switch for controlling one phase of the motor, the electronic switch being controlled by the control circuit. According to the invention, the starter system comprises a sensor intended to deliver an analogue signal that is representative of the derivative of a current flowing through the phase of the motor, and a detection board that comprises means for transforming said analogue signal into a binary signal that is representative of the changes in sign of said analogue signal. The detection board also comprises means for transmitting said binary signal to the control circuit, so as to optimize the control of the electronic switch.

According to one feature, the transmission means first convert the binary signal into an optical signal which is transmitted to the control circuit via optical fibre.

Preferably, the sensor is a Rogowski torus surrounding one phase and the detection board is placed in the immediate proximity of the sensor.

According to another feature, the motor is a three-phase motor and the starter system comprises three electronic switches that are controlled by the control circuit in order to control each phase of the motor.

According to one embodiment, the starter system comprises three sensors surrounding each power supply phase of the motor and delivering three analogue signals and comprises three detection boards, each detection board being connected to a sensor and each transmitting a binary signal to the control circuit.

According to another embodiment, the starter system comprises three sensors surrounding each phase of the motor and delivering three analogue signals and a single shared detection board, the shared detection board being connected to the three sensors and transmitting a single shared binary signal to the control circuit, the shared binary signal being representative of the changes in sign of the three analogue signals, these changes in sign not occurring simultaneously.

According to another embodiment, the starter system comprises a single shared sensor surrounding the set of phases of the motor and a single detection board, which board is connected to the shared sensor and transmits a single binary signal to the control circuit.

The implementation of this detection technology with a Rogowski-type sensor allows the thyristors to be precisely triggered by knowing the crossings of the voltage minima across the terminals of the thyristors, thus drastically reducing the electrical constraints imposed thereon. It is all the more efficacious when the detection of the zero crossings of the derivative of the phase current is itself quick and precise.

Advantageously, the proposed solution does not require analogue/digital conversion followed by optical transmission of a digitized analogue quantity to be carried out, which would introduce a delay that would be unacceptable for the performance required in terms of measurement precision and lag. It is effectively much simpler to transmit a binary signal, rather than a digitized analogue signal, via optical fibre.

BRIEF DESCRIPTION OF THE FIGURES

Other features and advantages will appear in the following detailed description given in conjunction with the appended drawings in which.

DETAILED DESCRIPTION OF AT LEAST ONE EMBODIMENT

Figure 4:
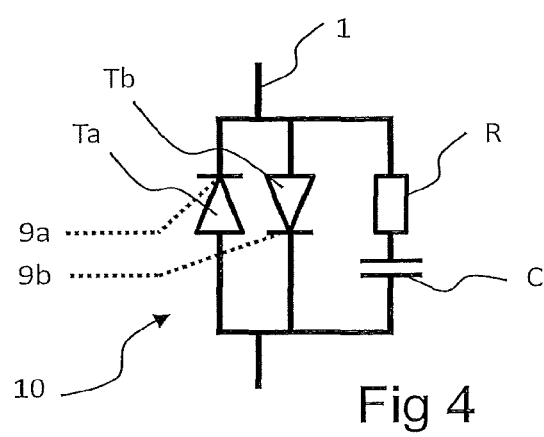
FIG. 4 shows, in detail, an electronic switch intended to control one phase of an electric motor.

Referring to FIG. 4, an electronic switch 10 is connected to one phase of an AC electrical network 1 and comprises two thyristors Ta, Tb connected back to back in parallel, as well as an RC damping circuit (snubber) comprising a resistor R in series with a capacitor C. The damping circuit is connected in parallel with the thyristors Ta, Tb. On each half-cycle of the AC voltage of the network 1, the trigger of the thyristors Ta, Tb, respectively, may be controlled by close orders 9a, 9b, respectively. When neither of the thyristors Ta, Tb is conducting, a transient current may flow through the switch 10 via the RC damping circuit.

Figure 1:
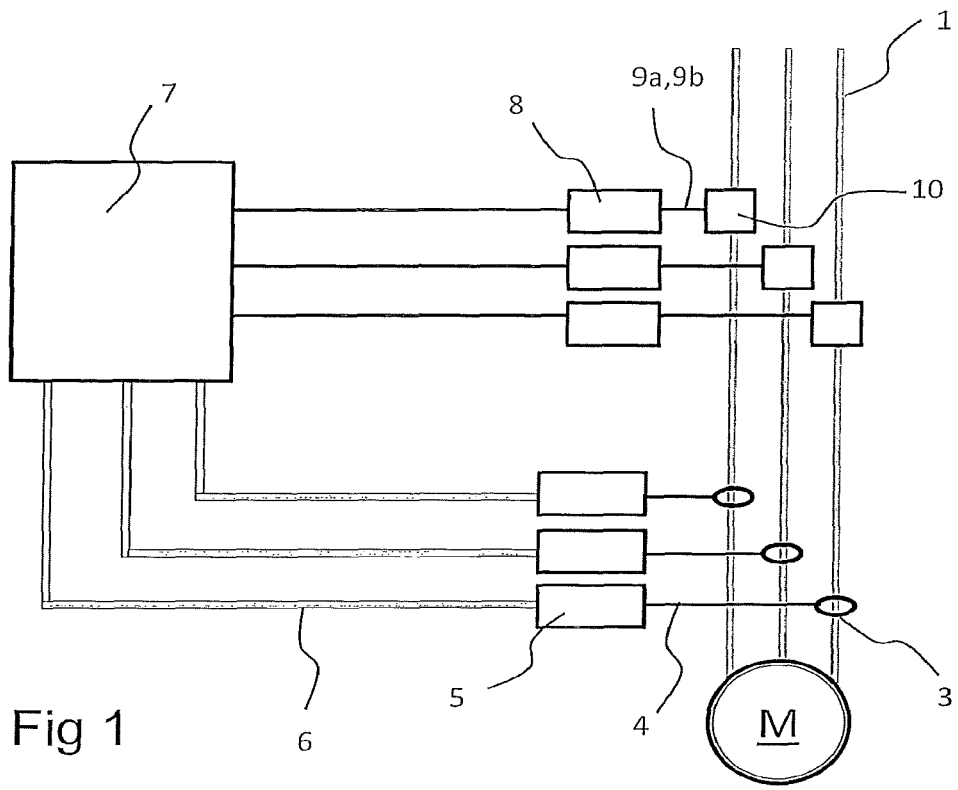
FIG. 1 shows a first embodiment of a starter system according to the invention.

FIG. 1 describes a soft starter system for a three-phase electric motor M supplied by a three-phase AC electrical network 1. The starter system comprises an electronic switch 10 connected to each phase of the electrical network between the power source of the network and the motor M. The starter system controls the three electronic switches 10 so as to gradually vary the voltage across the terminals of the motor M.

The starter system comprises a control circuit 7 which is in particular responsible for controlling the electronic switches 10 by transmitting close orders 9a, 9b to the thyristors Ta, Tb according to the control instructions. The control circuit 7 comprises elements (microprocessor, DSP, FPGA, etc.) for controlling the starter system and may equally be composed of one or more separate modules (not shown in the figures). It may, for example, comprise an isolated interface module in order to guarantee the safety of hardware and persons potentially having to interact with a control module.

In order to limit the impact of EMC interference, in particular in high-voltage applications, the starter system also comprises electronic boards 8 that are connected between the control circuit 7 and the electronic switches 10, and placed in the immediate geographical proximity of the electronic switches 10, in order to transmit the orders 9a, 9b, which orders may then be transmitted by optical fibre.

To optimally determine the instants at which the thyristors Ta, Tb of an electronic switch 10 close, the starter system comprises a sensor that measures the derivative of the current flowing across the terminals of this switch. As explained above, this measurement of the derivative of the current flowing through the electronic switch 10 may advantageously be used to synchronize control of the thyristors of this switch.

Preferably, the sensor 3 is a Rogowski torus surrounding one phase of the motor M, between the switch 10 and the motor M, and which delivers an analogue signal 4 that is representative of the derivative of a current flowing through the phase of the motor. In the embodiment of FIG. 1, the starter system comprises three Rogowski tori 3, each torus surrounding one phase of the three-phase motor M.

According to the invention, the starter system also comprises an electronic detection board 5 that receives the analogue signal 4 originating from the sensor 3 and which is intended to produce a binary signal 6 that is representative of the changes in sign of the analogue signal 4, then to transmit this binary signal 6 to the control circuit 7, so as to optimize the instants at which the thyristors of the electronic switch 10 are closed. The detection board 5 carries out the following functions:

a first function, referred to as "sensor instrumentation". This function reads the analogue signal 4 coming from the sensor 3 by means of an appropriate load and a buffer then carries out impedance matching for connecting to the subsequent functions. This function also electrically protects the detection board 5;

a second function, referred to as "filtering". This function selects the frequency band in which the useful analogue signal 4 is located. The passband of this function is wide enough to allow the detection of a damped oscillating transient signal with a frequency that is quite high with respect to the network frequency, i.e. of the order of 1 to 5 kHz;

a third function, referred to as "transformation". This function detects the changes in sign of the analogue signal received from the second function in order to create a binary signal that is representative of these various changes in sign. The detection board 5 therefore comprises means for transforming the received analogue signal into a rectangular binary signal (also referred to as a digital signal or on-off signal), whose edges coincide with the zero-crossing instants of the analogue signal. Thus, on each sign change of the analogue signal, the binary signal changes value, i.e. switches from value 0 to 1 or from value 1 to 0;

a fourth function, referred to as "transmission". The detection board 5 comprises transmission means that transmit the binary signal 6 produced by the transformation means to the control circuit 7.

A first advantage of this solution is the decentralization, in the detection board 5, of part of the processing to be carried out, namely the processing of the analogue signal 4. This above all reduces the processing to be carried out in the control circuit 7, which thus directly receives a pre-processed binary signal 6.

Additionally, in the case of a motor M supplied by a high-voltage network, the sensors 3 are installed around the cables of the network 1, hence in a high-voltage environment. They generate an analogue signal that is theoretically destined for a control circuit 7 which is in a low-voltage environment. There is therefore a risk of (EMC) interference occurring due to high-frequency overvoltages (generating interfering electric fields) present in this environment and due to currents comprising high harmonic content (5, 7, etc.) and high frequencies generating magnetic fields when the thyristors switch.

It is therefore necessary to limit the impact of this EMC interference on the operation of the detection system, of the control circuit 7 and of the means for transmitting the zero crossings of the current.

For this reason, the detection board 5 is physically separate from the control circuit 7 and is placed in the immediate proximity of the sensor 3, e.g. at a distance of less than 50 cm. The transmission means of the detection board 5 additionally form an isolated interface by virtue of an electrical-optical converter that converts the electrical binary signal to an optical binary signal before its transmission. This optical binary signal 6 is subsequently sent via optical fibre to the control circuit 7, which circuit in this case of course comprises an optical-electrical converter in order to recover a usable electrical binary signal.

This electrical-optical conversion of the binary signal thus guarantees the galvanic isolation of, on the one hand, the control circuit 7 and, on the other hand, the detection board 5 connected to the sensor 3. This is particularly recommended in the context of a starter system intended to control a high-voltage motor.

Advantageously, the proposed solution does not require analogue/digital conversion followed by optical transmission of a digitized analogue quantity to be carried out, which would introduce a delay that would be unacceptable for the performance required in terms of measurement precision and lag. It is effectively much simpler to transmit a binary signal, rather than a digitized analogue signal, via optical fibre. Moreover, the exchanges of information between the control circuit 7 and the detection board 5 do not require the implementation of a link using a communication protocol, which would also slow down these exchanges.

It would also be possible to envisage other types of isolation, such as conversion of the electrical binary signal to a radio signal. However, electrical-optical conversion allows a very fast real transmission time and introduces only a very short delay (of the order of 10 µs for electrical-optical followed by optical-electrical conversion), which is not detrimental to the precise determination of the instants at which the thyristors close.

In the embodiment of FIG. 1, the starter system thus comprises three detection boards 5. Each detection board 5 corresponds to one phase of the motor M and is placed in the immediate proximity of the corresponding sensor 3 which delivers an analogue signal 4 thereto.

Figure 2:
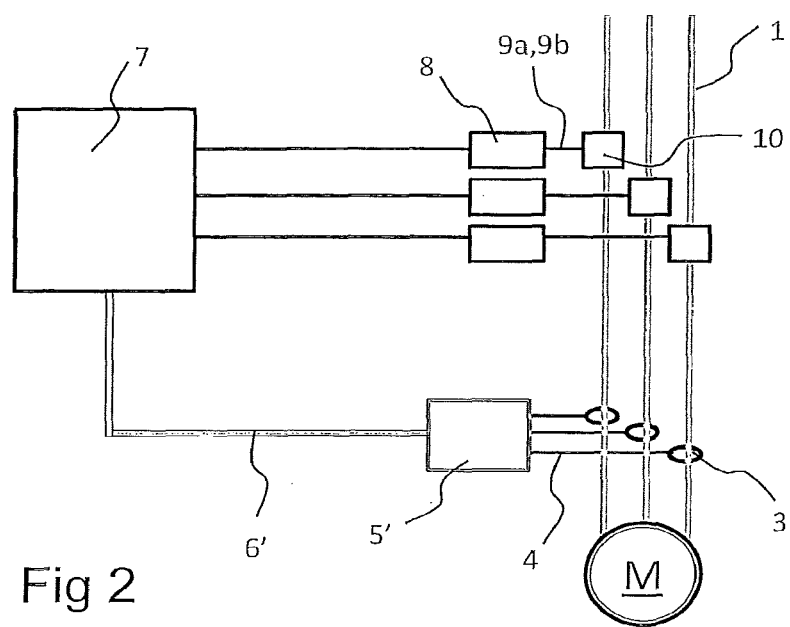
FIGS. 2 and 3 show two other embodiments, respectively.

According to one variant presented in FIG. 2, the starter system comprises only a single shared electronic detection board 5' which is connected to the three sensors 3 of the three phases of the electrical network 1. In this case, a single shared binary signal 6' is created and sent to the control circuit 7, this shared binary signal 6' being representative of the changes in sign of the set of three analogue signals 4 originating from the three sensors 3, which is possible as the changes in sign do not occur simultaneously.

This embodiment is simpler, as it uses only a single detection board 5' and only a single optical binary signal 6', hence only one electrical-optical converter in the detection board 5' and only one optical-electrical converter in the control circuit 7. Having only a single detection board 5' also makes it possible to have to provide only one isolated power supply to supply power to this board 5'.

However, this embodiment requires additional processing of the signal in the control circuit 7 in order to determine to which phase of the network a given sign change transmitted by the binary signal 6' corresponds. This processing of the signal may, for example, be done by taking into account the information on the various currents flowing through each phase, known from elsewhere.

Figure 3:
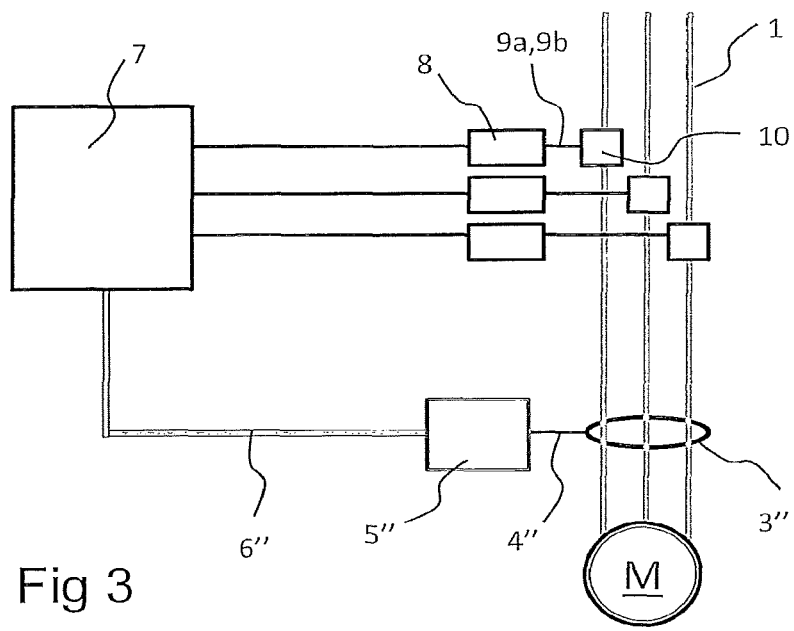

According to another variant presented in FIG. 3, the starting system comprises only one shared Rogowski torus 3", connected between the switches 10 and the motor M and surrounding the set of three phases of the motor M, as well as a single detection board 5". The shared Rogowski torus 3' therefore delivers a single analogue signal 4" which is representative of the derivative of the currents flowing through the set of phases of the motor M. The detection board 5" receives the analogue signal 4" and transmits a single binary signal to the control circuit 7. This solution further simplifies implementation and is more economical as it comprises only one measuring torus and only a single detection board with a single isolated power supply.

The invention claimed is:

1. A starter system for an electric motor supplied by a high-voltage electrical network, the starter system comprising:
    an electronic control circuit;
    an electronic switch to control one phase of the electric motor, the electronic switch being controlled by the electronic control circuit;
    a sensor to deliver an analog signal that is representative of a derivative of a current flowing through the one phase of the electric motor; and
    a detection board between the electronic control circuit and the sensor, the detection board including circuitry configured to:
    transform the analog signal into a binary electrical signal that is representative of changes in sign of the analog signal,
    convert the binary electrical signal into a binary optical signal, and
    transmit the binary optical signal to the electronic control circuit to control the electronic switch,
    wherein the binary optical signal is transmitted to the electronic control circuit via optical fiber without implementing a link using a communication protocol.

2. The starter system according to claim 1, wherein the circuitry of the detection board filters the analog signal.

3. The starter system according to claim 1, wherein the electronic control circuit converts the received binary optical signal to a binary electrical signal.

4. The starter system according to claim 1, wherein the electrical switch includes two thyristors connected back to back and in parallel with a damping circuit having a resistor in series with a capacitor.

5. The starter system according to claim 1, wherein the sensor is a Rogowski torus surrounding the one phase of the electric motor.

6. The starter system according to claim 1, wherein the detection board is placed in the immediate proximity of the sensor at a distance of less than 50 cm.

7. The starter system according to claim 1, wherein the electric motor is a three-phase motor, and the starter system comprises three of said electronic switches that are controlled by the electronic control circuit to respectively control each of the three phases of the electric motor.

8. The starter system according to claim 7, wherein the sensor is a single shared sensor surrounding the phases of the electric motor, and the detection board is a single detection board connected to the single shared sensor and transmits a single binary optical signal as said binary optical signal to the electronic control circuit.

9. The starter system according to claim 7, further comprising three of said sensors surrounding each said phase of the electric motor and respectively delivering the analog signal for each said phase of the electric motor.

10. The starter system according to claim 9, further comprising three of said detection boards, each said detection board being connected to a respective one of said sensors and respectively transmitting three of said binary optical signals to the electronic control circuit.

11. The starter system according to claim 9, wherein the detection board is a single shared detection board, the single shared detection board being connected to the three sensors and transmitting a single shared binary optical signal as said binary optical signal to the electronic control circuit, the shared binary optical signal being representative of the changes in sign of the three analog signals.

\* \* \* \* \*